US005784461A

United States Patent [19]
Shaffer et al.

[11] Patent Number: 5,784,461
[45] Date of Patent: Jul. 21, 1998

[54] SECURITY SYSTEM FOR CONTROLLING ACCESS TO IMAGES AND IMAGE RELATED SERVICES

[75] Inventors: Stephen L. Shaffer, Penfield; Kevin Arnold Townsend, Brockport, both of N.Y.

[73] Assignee: Eastman Kodak Company, Rochester, N.Y.

[21] Appl. No.: 653,737

[22] Filed: May 23, 1996

[51] Int. Cl.[6] .................................................. H04L 9/00
[52] U.S. Cl. ............................................. 380/21; 380/20
[58] Field of Search ........................................ 380/20, 21

[56] References Cited

U.S. PATENT DOCUMENTS

| | | | |
|---|---|---|---|
| 4,694,489 | 9/1987 | Frederiksen | 380/10 |
| 5,191,611 | 3/1993 | Lang | 380/25 |
| 5,222,137 | 6/1993 | Barrett et al. | 380/21 |
| 5,223,701 | 6/1993 | Batterman et al. | 235/494 |
| 5,477,353 | 12/1995 | Yamasaki | 358/487 |
| 5,495,533 | 2/1996 | Linehan et al. | 380/21 |

OTHER PUBLICATIONS

Aldus Corporation, OPI Open Prepress Interface Specification 1.1, Apr. 3, 1989, pp. 1-6.

Primary Examiner—Thomas H. Tarcza
Assistant Examiner—Carmen D. White
Attorney, Agent, or Firm—Thomas H. Close

[57] ABSTRACT

A secure method for granting customer access to images and image related services at an image fulfillment center, includes the steps of: scanning a customer film image to generating high and low resolution digital versions of the image; appending a unique ID and associated security key to the high resolution version of the image and storing the appended image at the fulfillment center; encrypting the ID with a shared encryption key and appending the encrypted ID and the security key to the low resolution version of the image and sending the appended low resolution image to the customer; using the security key to encrypt a request for services relating to the high resolution version of the image and sending the encrypted ID with the encrypted request to the fulfillment center; decrypting the ID using the shared encryption key at the fulfillment center and using the decrypted ID to retrieve the appended high resolution version of the image; and retrieving the key from the appended high resolution version of the image and employing the key to decrypt the request for services.

7 Claims, 3 Drawing Sheets

SECURITY SYSTEM FOR CONTROLLING ACCESS TO IMAGES AND IMAGE RELATED SERVICES

FIELD OF THE INVENTION

The invention relates generally to the field of digital imaging, and in particular to security systems for controlling access to digital images and image related services.

BACKGROUND OF THE INVENTION

Systems have been proposed which allow a user to electronically incorporate high-resolution color images into publications produced with a page layout program operating on a personal computer. In a typical scenario, the customer takes original photographs to a color prepress vendor before creating the publication in which the photographs will be placed. The vendor creates two versions of each scanned image: a high-resolution version, which is stored on disk or tape, and a lower resolution color Tag Image File Format (TIFF) version, which is sent to the customer. The customer uses the lower resolution version to create a layout and when satisfied, sends instructions to the vendor to create the publication using the high resolution version of the image. A description of this system is contained in the OPI Open Prepress Interface Specification 1.1 published Apr. 3, 1989, by Aldus Corporation, Seattle, Wash. 98104, Part # N8091.

More recently, it has been proposed that a photography customer would drop off her exposed film at a photofinisher where it would be processed, photographically printed and optionally scanned at a high resolution (e.g. 2048×3072 samples over surface of 35 mm film frame) and the digital images stored at the photofinisher. The customer is given a floppy diskette containing lower resolution versions of her images and a list of image related services. Subsequently the customer can review the low resolution images on the floppy diskette on her personal computer, select desired images and request that the photofinisher provide reproductions and other image related services using the stored high resolution digital images, including reprints, enlargements and image bearing gift items. The order may be placed over a publicly accessed network, such as the public telephone lines or the Internet.

Some problems associated with this proposal are in insuring that there is a 1:1 association between the low resolution image file held by the customer and the centrally stored high resolution images, and that only the owner of the images can request services from a networked based print service.

A general method of controlling access to information stored on a specific storage media is described in U.S. Pat. No. 5,191,611 wherein a Personal Accessing Device, such as a smart card (a physical token device which encapsulates one-time programmable solid state memory, optionally a microprocessor device and optionally special integrated circuit to perform cryptographic operations at high speed) is used to control access to portions of a storage volume or physical volume (such as an single CD-ROM). Security is achieved by three measures: 1) a personal identification code must be entered after the smart card is inserted into the system interface in order for it to function, 2) a well understood mechanism is used with random numbers for challenge and response which requires a similar computation take place at both the site of the smart card and the site under access, 3) the storage volume is mapped with information that will only provide access to a subset of the total information on a single volume or logical set of volumes.

In the application described above, access to the storage medium implies access to the computer system to which the medium reader is attached since current practice would unlikely build all the functions necessary to inter-operate on a network into the medium reader. There is concern that once the user has access to the attaching computer, that unauthorized access to those areas of the medium protected by the file system may be arranged. Many techniques have been devised by "hackers" to circumvent controls such as those described, or change the level of permissions allowing access without overtly circumventing controls. The use of a physical token, tied to a specific user is a good measure in this invention to control access to those that possess the token and know the matching Personal Identification Code.

A technique is needed that combines a physical token for allowing a user access to a storage facility with control at a finer level of granularity than pre-assigned subsets of a single storage volume or set of storage volumes. Also, the method should work without requiring user "accounts" as is becoming common in the Internet with access by anonymous users to a network computer using protocols and techniques described as the World Wide Web.

SUMMARY OF THE INVENTION

The present invention is directed to overcoming one or more of the problems set forth above. Briefly summarized, according to one aspect of the present invention, a secure method for granting customer access to images and image related services at an image fulfillment center, includes the steps of: scanning a customer film image to generating high and low resolution digital versions of the image; appending a unique ID and associated security key to the high resolution version of the image and storing the appended image at the fulfillment center; encrypting the ID using a shared encryption key and appending the encrypted ID and the security key to the low resolution version of the image and sending the appended low resolution image to the customer; using the security key to encrypt a request for services relating to the high resolution version of the image and sending the encrypted ID with the encrypted request to the fulfillment center; decrypting the ID using the shared encryption key at the fulfillment center and using the decrypted ID to retrieve the appended high resolution version of the image; and retrieving the key from the appended high resolution version of the image and employing the key to decrypt the request for services.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention is advantageous in that the user is provided with a low resolution image that can be immediately used for viewing on their home computer as well as secure access to the high resolution versions of their images stored at an image fulfillment center.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
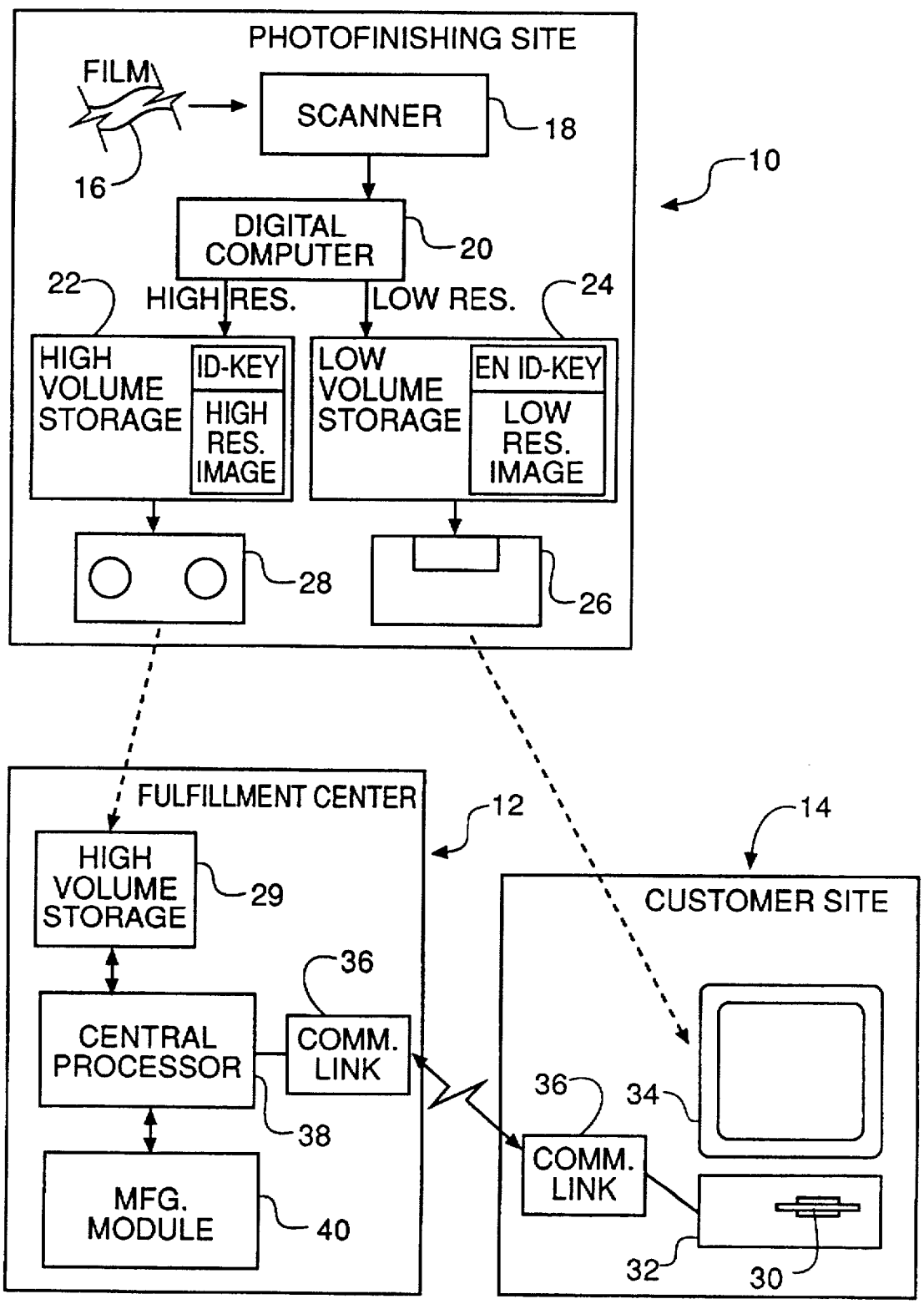
FIG. 1 is a schematic diagram of a system for performing the method of the present invention.

Beginning with FIG. 1, a system for performing the method of the present invention is shown. The system includes a photofinishing site 10, a fulfillment center 12, which may be located either at or remote from the photofinishing site 10, and a customer site 14 which may be located at a customer's home or place of business. At the photofinishing site 10, a customer's film 16 is processed and scanned in a film scanner 18 to produce a digital image. The digital image is processed in a digital computer 20 to produce low and high resolution versions of the digital image. The low resolution version, for example may be a 384×256 pixel image sufficient for viewing on a color monitor and the high resolution version may be a 3072× 2048 pixel image suitable for producing a high quality print.

The digital computer 20 appends a unique ID and a security key to the high resolution version of the image and stores the appended image in a high volume storage device 22, such as a magnetic tape cartridge drive. The image digital computer 20 encrypts the unique ID and appends the encrypted ID and the security key to the low resolution image and stores the low resolution image on a low volume storage device 24, such as a floppy diskette drive. The appended low resolution images, stored on a low volume storage medium, such as a floppy diskette 26 are sent to the customer site 14.

If the fulfillment center 12 is located remotely from the photofinishing site 10, the appended high resolution images are stored on a high volume storage medium, such as a digital tape cassette 28 and are sent to the fulfillment center 12, where they are kept in a high volume storage 29. In this case, the computer 20 may encrypt the ID and security key using a public key owned by the fulfillment center prior to appending the ID and public key to the high resolution images.

At the customer site 14, the customer inserts the floppy diskette 26 into the diskette drive 30 of her personal computer 32 and views the low resolution version of the images on the display 34 of the computer. The customer selects which images that she wants to receive prints, enlargements, or other image related services for and prepares an order for the services. The customer's computer 32 is programmed to use the security key supplied with the image to encrypt the request for services. The customer then sends the encrypted request for services, along with the encrypted ID that was supplied with the low resolution version of the image to the image fulfillment center 12 via a communication link 36, such as a telephone line, or an Internet connection.

At the image fulfillment center 12, the encrypted request for services is received by a communication link 36 and is processed by a central processing computer 38. The central processing computer 38 decrypts the ID and employs the decrypted ID to retrieve the security key stored along with the high resolution version of the image in the high volume storage 29. The computer 38 then uses the security key to decrypt the request for services, and issues the request for services to a manufacturing module 40.

Figure 2:
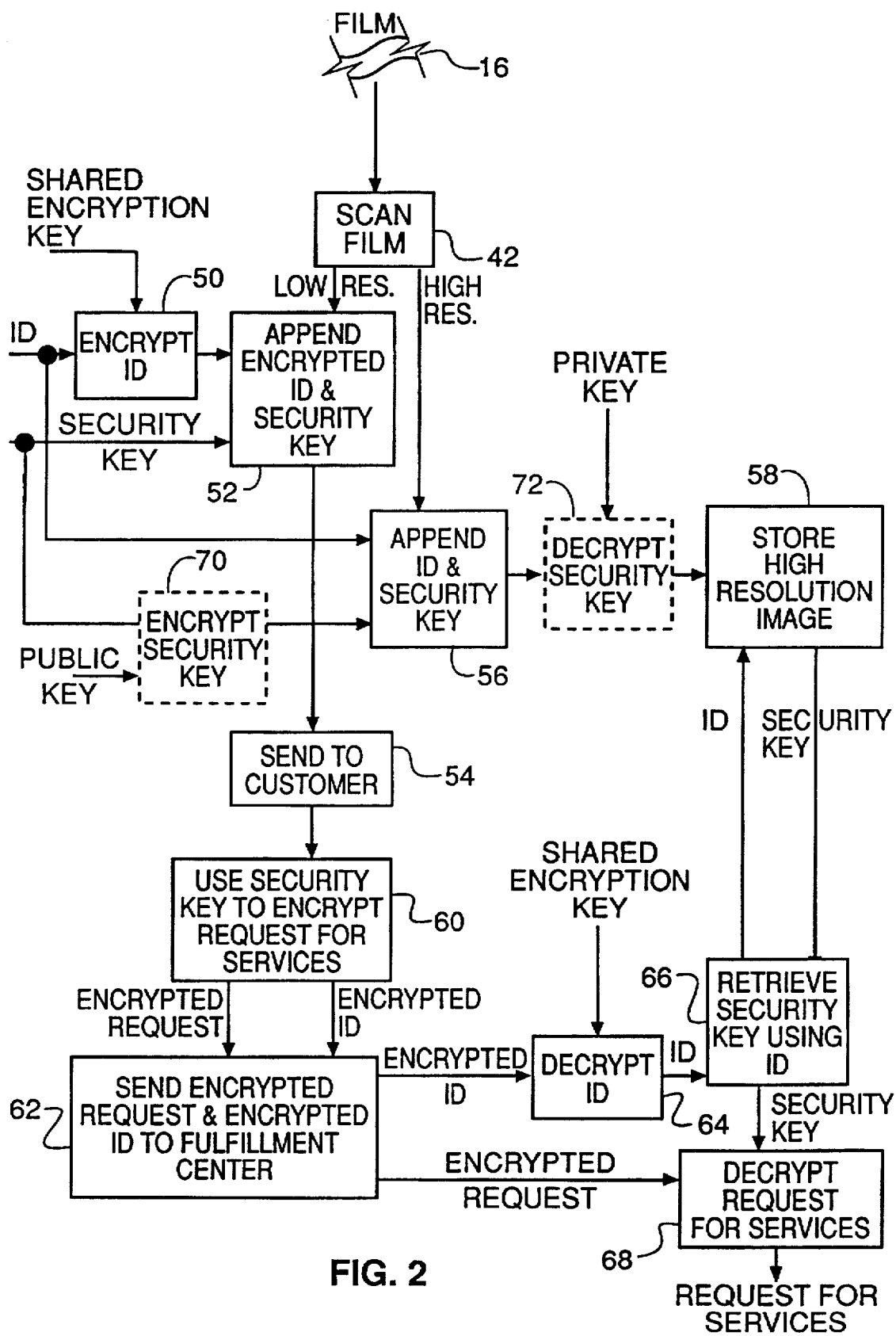
FIG. 2 is a flow chart illustrating the method of the present invention.

Turning now to FIG. 2, the method of the present invention will be described in further detail. In a preferred embodiment of the present invention, the services provided by the photofinisher include performing a high resolution digital scan 42 of the film 16 or other medium with latent photographic image. The high resolution scan is sufficient to allow this data to be subsequently used for image enhancement and high quality reproduction and is generally an order of magnitude greater than needed for computer monitor display. Also, it is desirable to keep this high resolution data at or near its original state without applying irreversible data reduction techniques (e.g. compression). From this data, a low resolution proxy image is created with suitable resolution, color attributes and perhaps data reduction such that it is efficient for storage on low cost portable media (diskette) or smart card and suitable for display on generally available computer CRT monitors.

The two (2) related images are physically separated to different mediums or transmission paths.

It is envisioned the low resolution proxy image will be placed with others that belong to the recipient consumer on a low cost portable media such as diskette or a smart card. The high resolution images are batched along with others destined for the fulfillment center on a high capacity storage medium or for subsequent transmission to a fulfillment center over a secure path (e.g. by courier).

According to the present invention a secret encryption key is shared by each photofinisher scanning site and fulfillment center. The shared encryption key is periodically changed by physical means (out-of-band, non-electronic) or via secure network transmission protocols as is well understood and documented in the literature.

Figure 3:
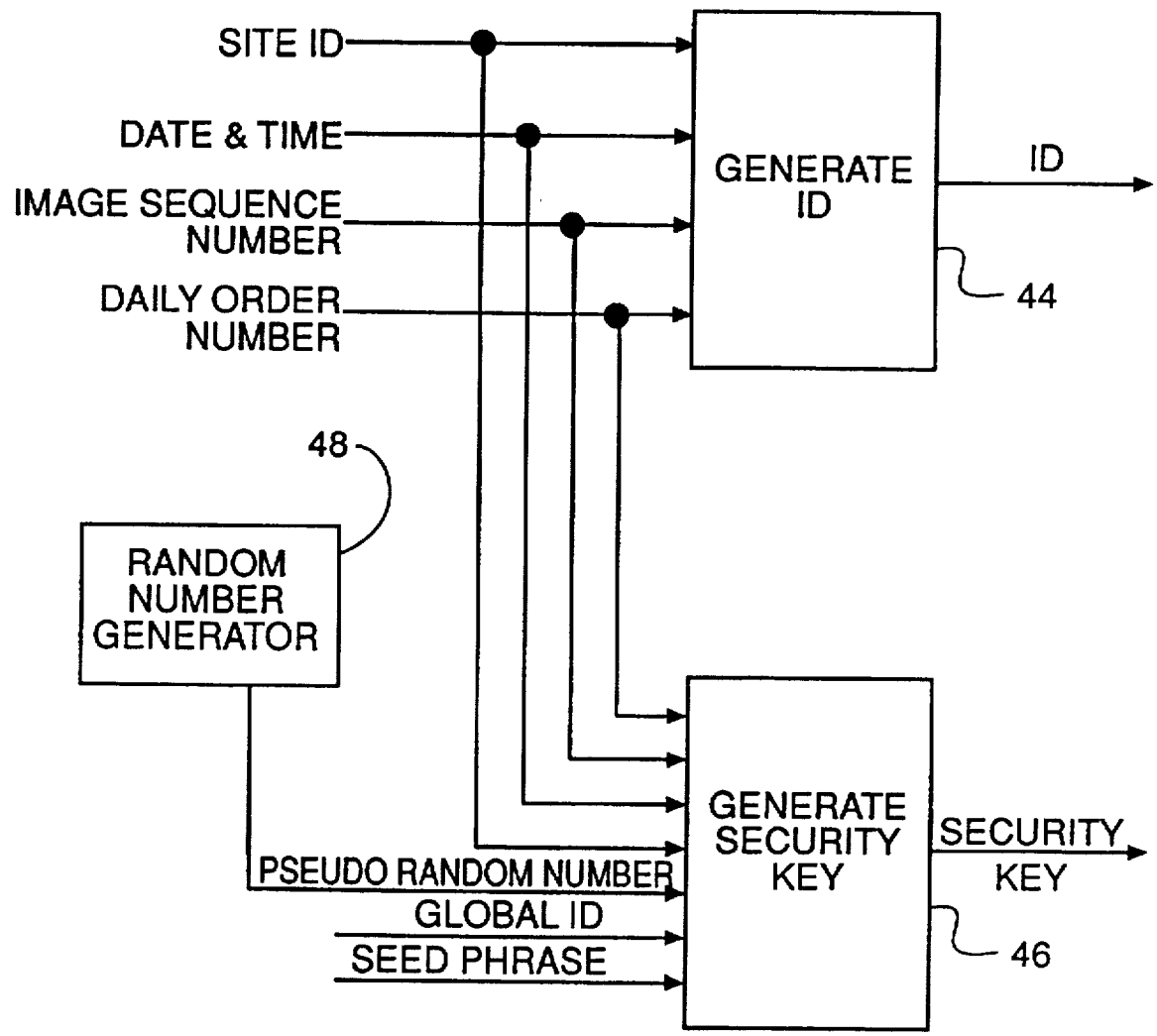
FIG. 3 is a schematic diagram showing the creation of the image ID and matching security key.

Referring to FIG. 3, for each image, a unique identifier (ID) within the context of the system is generated. This process uses a site unique identification for each scan site that participates in the system, universal date and time information, relative information about the image location in a film strip, such as its daily order number and image sequence number within the roll. These numbers are concatenated 44 to generate the ID.

A security key is generated 46 from the same information used to generated the ID, plus additional information, including a pseudo random number created by a random number generator 48; a global ID of the type currently used in distributed software architectures and specified in format and generation by ISO standard is generated by computer 20; and a seed phrase such as "quality images by Kodak". The security key is generated from this sequence of data by a one way hash function. For example,the string of data, represented as 8-bit bytes of computer data (for example, 64 bytes of data) is fed into the one way hash function, as documented in the Secure Hash Standard, FIPS PUB 180-1. The output of this process is a random sequence of for example, 20 bytes, which are highly dependent on every bit within the input sequence of bytes. A rule is applied at each scan site on a consistent basis to pick a subset of these bytes to be used as the security key for use with a symmetric encryption algorithm as described below to encrypt request for services (e.g. the low 16 bytes are picked for use as the security key for the IDEA encryption algorithm. Published International Patent Application PCT/CH91/00117, published 28 Nov. 1991).

Returning to FIG. 2, the ID is encrypted 50 using the shared encryption key. The encrypted ID and security key are appended 52 to the low resolution image, and the appended images are placed on a physical storage medium and transferred to the customer 54. The unencrypted ID and the security key are appended 56 to the high resolution version of the image and the appended high resolution images are stored 58.

The set of security tagged proxy images on a particular portable storage medium form a security token that may be used by the customer to access her personal images and image related services from a fulfillment center. Without the hacker will not be able to access the high resolution images stored at the fulfillment center. The method of the present invention will also prevent access to the high resolution images if the tagged images are copied electronically to another storage location such as the hard disk of the computing device with which a hacker would attempt to gain unauthorized access to the images. This provides an adequate level of security for images of a personal nature that the consumer desires to keep confidential. The method also creates a unique association between each image and its full resolution counterpart to be stored on the consumers behalf in the fulfillment center.

A consumer in possession of low resolution images on the floppy diskette 26 may view their personal images on their home computer. The environment for performing this viewing is created either with elements that can enhance a standard viewing environment (such as a commercially available Internet World Wide Web browser) or stand-alone image viewing application software package. Either of these vehicles may be provided on the floppy diskette 26 and embody the specific knowledge necessary to communicate to the fulfillment center in a secure fashion. After viewing the low resolution version of their images, a customer requests services relating to the full resolution version of their images from the image fulfillment by sending an encrypted request for services to the fulfillment center.

The customer uses the security key associated with a particular image to encrypt 60 a request for services relating to that image. The customer then sends 62 the encrypted request along with the encrypted ID relating to the image to the fulfillment center. The encrypted request for services is independent of the underlying protocol(s) used to establish a telecommunication data transfer connection with the fulfillment center At the fulfillment center, the shared encryption key is used to decrypt 64 the encrypted ID. The decrypted ID is then used to located the stored high resolution image and retrieve 66 the security key appended to the image. The retrieved security key is then used to decrypt 68 the encrypted request for services. The image related services may include, but are not limited to: providing prints and enlargements of the image; electronically sending an encrypted version of the high image to the customer, using the security key; sending prints or digital images to addresses supplied in the request; and creating and sending image bearing products, such as T-shirts and mugs.

The results of decrypting the encrypted request for services ensures a 1:1 relationship between the customer and her images and protects the information. Using the shared encryption key, the fulfillment center is able to decrypt the ID and discover the identity of the image under consideration. The 1:1 relationship between the proxy image and the full resolution image is guaranteed by the I. D.. Any transmission errors or tampering with the information, will disturb this relationship and prevent the fulfillment center from proceeding with the delivery of image services.

In the event that the fulfillment center is remote from the photofinishing site, the security of the high resolution image may be protected at the photofinishing site by encrypting 70 the security key appended to the images using a public key belonging to the fulfillment center, and appending the encrypted security key to the high resolution version of the image. At the fulfillment center, the security key is decrypted using a corresponding private key. As a result, if the high resolution images were to be intercepted by a third party, the third party would not be able to use the images to provide services relating to the images.

According to a further aspect of the present invention, a mechanism for secure delivery of the high resolution image to the customer is provided. The rightful owner of the image, in possession of the low resolution image, already has the basis for constructing a higher resolution version of the image. The processing of a request for delivery of this high resolution image will involve encrypting and sending only the difference between the low resolution and higher resolution versions of the image. Without the low resolution image as provided on the floppy diskette to the customer, the difference image provided over the network would not be sufficient to reconstruct the higher resolution version of the image.

The difference data is protected both by encryption with the security key, and by the process for transmitting the data which provides only the difference data. In this manner, the interception and decryption of the difference data, in and of itself, is not sufficient to allow utilization of the higher resolution image without access to the base image.

As a final improvement on this scheme, the security can be made even stronger by allowing the individual who drops off the film for processing to also provide their own secure storage medium to which they (or the originator of the medium) have assigned a personal access code (usually a password or biometric data unique to the owner of the storage). The storage medium could be a smart card with memory function and security feature for storing the low resolution image or a diskette with the customers public key. In the case of the smart card, the low resolution images are written to the smart card in a write only manner. The written images can only be accessed by the customer using their personal access data. In the case of the diskette, the security keys for the images are encrypted with the customers public key and are written to the diskette as described previously. The processed film and prints are returned to the customer in the original photofinishing envelope along with the secure storage medium. Now, in addition to possession of the secure storage medium, the individual attempting to access the tokens, must provide the personal access datum, or have the private key to read the security elements from the storage medium during interaction with the fulfillment center.

The invention has been described with reference to a preferred embodiment. However, it will be appreciated that variations and modifications can be effected by a person of ordinary skill in the art without departing from the scope of the invention.

PARTS LIST 10 photofinishing site
12 fulfillment center
14 customer site
16 customer film
18 film scanner
20 digital computer
22 high volume storage device
24 low volume storage device
26 floppy diskette
28 digital tape cassette
29 high volume storage device
30 diskette drive
32 personal computer 34 display
36 communication link
38 central processing computer
40 manufacturing module
42 scan film step
44 generate ID step
46 generate security key step
48 random number generator
50 encrypt ID step
52
54 append encrypted ID and security key step
54 send to customer step
56 append ID and security key step
58 store high resolution image step
60 encrypt request for services step
62 send encrypted request step
64 decrypt ID step
66 retrieve security key step
68 decrypt request for services step

We claim:

1. A secure method for granting customer access to images and image related services at an image fulfillment center, comprising the steps of:

a) scanning a customer film image to generate high and low resolution digital versions of the image;

b) appending a unique ID and associated security key to the high resolution version of the image and storing the appended image at the fulfillment center;

c) encrypting the ID with a shared encryption key and appending the encrypted ID and the security key to the low resolution version of the image and sending the appended low resolution image to the customer;

d) using the security key to encrypt a request for services relating to the high resolution version of the image and sending the encrypted ID with the encrypted request to the fulfillment center;

e) decrypting the ID using the shared encryption key at the fulfillment center and using the decrypted ID to retrieve the appended high resolution version of the image; and f) retrieving the security key from the appended high resolution version of the image and employing the retrieved security key to decrypt the request for services.

2. The method claimed in claim 1, wherein the scanning is performed at a photofinisher location remote from the image fulfillment center, and further comprising the steps of:

a) after scanning the film, encrypting the ID and security key using a fulfillment center public key and appending the encrypted ID and security key to the high resolution version of the image;

b) sending the appended high resolution version of the image to the fulfillment center; and c) decrypting the ID and security key at the fulfillment center using a fulfillment center private key.

3. The method claimed in claim 1, wherein the unique ID is generated by combining a scan site ID, a universal date and time, an image sequence number, and a daily order number.

4. The method claimed in claim 3, wherein the security key is generated by combining a scan site ID, a universal date and time, an image sequence number, a daily order number, a random number, a global ID, and a seed phrase, and hashing the resulting combination.

5. The method claimed in claim 1, wherein the high resolution version of the image is a difference image that does not contain any of the information contained in the low resolution version.

6. The method claimed in claim 1, wherein the low resolution version of the image is supplied to the customer on a secure smart card with memory function.

7. The method claimed in claim 1, wherein the appended security key is encrypted with a customers public key.

* * * * *